United States Patent [19]

Warner et al.

[11] 4,028,818
[45] June 14, 1977

[54] TRACKED INCLINE TEACHING APPARATUS

[76] Inventors: H. Burt Warner, 1713 S. Walnut Leaf Drive, Walnut, Calif. 91789; Earl Cameron Kruger, Jr., 5601 Sorrento Drive, Long Beach, Calif. 90803

[22] Filed: Oct. 29, 1976

[21] Appl. No.: 736,915

[52] U.S. Cl. .............................. 35/19 R; 273/120 R
[51] Int. Cl.² ........................................ G09B 23/10
[58] Field of Search ....................... 35/19 R; 46/43; 273/120 R, 120 A

[56] References Cited
UNITED STATES PATENTS

| | | | |
|---|---|---|---|
| 2,913,834 | 11/1959 | Keefe | 35/19 R |
| 3,249,358 | 5/1966 | Kessler | 273/120 R X |
| 3,594,925 | 7/1971 | Abbat | 35/19 R |
| 3,807,738 | 4/1974 | Breslow | 273/120 R X |

OTHER PUBLICATIONS

"Action and Reaction Apparatus" 22–160 Apparatus Co., Catalog, p. 88, Oct. 1916.

*Primary Examiner*—Harland S. Skogquist
*Attorney, Agent, or Firm*—Nilsson, Robbins, Dalgarn & Berliner

[57] ABSTRACT

An educational apparatus for teaching subject matter relating to mechanics and for demonstrating a number of experiments. The apparatus, in kit form, consists of an assortment of balls of diverse properties, and a pair of upright, parallel, elongate members whose top edges, spaced from one another, provide a track for the balls to roll on. The track has the shape of a double declivity, symmetrically declining from opposite ends toward a center portion which smoothly joins the two slopes. A graduated scale is aligned with the track for the measurements of the distances traveled by the balls. Detents secure the balls at the top of each of the opposite ends of the track and are synchronously retractable by actuation of a remote electrical switch to release the balls simultaneously.

12 Claims, 4 Drawing Figures

TRACKED INCLINE TEACHING APPARATUS

FIELD OF THE INVENTION

The field of art to which the invention pertains includes the field of apparatus for imparting instruction as well as testing knowledge and skill in applying experimental methods in the field of physical sciences and, more particularly, in the field of mechanics and dynamics of rigid bodies.

BACKGROUND AND SUMMARY OF THE INVENTION

Educational devices which demonstrate or illustrate the laws of physics are well known in the prior art. In general, only a few selected experiments can be performed with the aid of such prior devices; moreover, the type of experiments provided for by specific devices is usually oriented toward a single level of knowledge and understanding on the part of the students.

The present invention is adapted to overcome the limitations of the prior art by providing an inexpensive but reliable teaching apparatus for performing a variety of experiments relating to the kinetics of rigid bodies which are meaningful for grade school as well as for college students.

The apparatus, in kit form, includes an assortment of solid and hollow balls of different diameter and mass, and an inclined track defined by the parallel top edges of a pair of identical elongate, vertically aligned members which are spaced from one another. The track has the shape of a double incline which consists of two declivities of equal length, symmetrically sloping down from opposite ends toward a center where they are smoothly joined to each other. Detents are provided at opposite ends of the track to retain the balls placed thereon. Energization of electromagnetic relay means by actuation of a single, remote switch causes the detents to swing out of the way, thereby releasing the balls simultaneously for movement toward one another. A graduated scale is aligned with the track for measuring the distances traveled by each of the balls.

An easily comprehensible type of experiment would involve the movement of one ball released at one end of the track. The distances traversed by balls of different properties past the center, up the opposite slope and back again, can be measured, correlated and expressed in simple mathematical formulae. The speed of travel can be calculated as a function of distance per time, and so on. On the grade school level such experiments teach the basic skills of scale reading and record keeping; by combining observational procedures wth a measurement approach, children learn how to find solutions to problems, and how to validate their answers. On a more advanced level the fundamentals of statistics and geometry may be introduced. The decelerating force of friction may be studied with respect to engineering problems, and the coefficient of friction may be evaluated for an uncoated track as well as for various surfactants. Conservation of energy and momentum, for instance, or acceleration due to gravity, suggest an analytical approach to elementary kinetic equations, vectors and mathematical calculus. Another group of experiments involving two or more balls of identical or different properties simultaneously released from opposite ends of the track and undergoing elastic or inelastic collisions, may be used to introduce the mathematical concepts of differential equations and their application to the phenomena of oscillations or the time constants associated with damping.

Another demonstration of physical principles may be performed by rolling two hollow balls down the opposite declivities. One of the balls may be filled with oil and the other with water, to illustrate how the respective velocities are affected by the liquid with which they are filled. Yet another group of experiments may be performed by placing a block on the planar surfaces of the top edges for movement with the platform of a hand-held spring scale, and by comparing the difference in force required to support the object on the tilted surfaces compared to the force required to support it vertically on the scale platform.

These experiments and others which readily suggest themselves to one skilled in the art indicate the versatility and flexibility of the invention, and its applicability to teach the methodology of scientific endeavor as well as specific subjects in the physical sciences. Beyond this, it stimulates inventiveness in proposing additional experiments which is an important part of the learning experience. Due to the compactness of the kit, its simple construction and the ease of operation, the apparatus may be used without an instruction manual and without supervision of the students on the part of the teacher.

DETAILED DESCRIPTION

Figure 1:
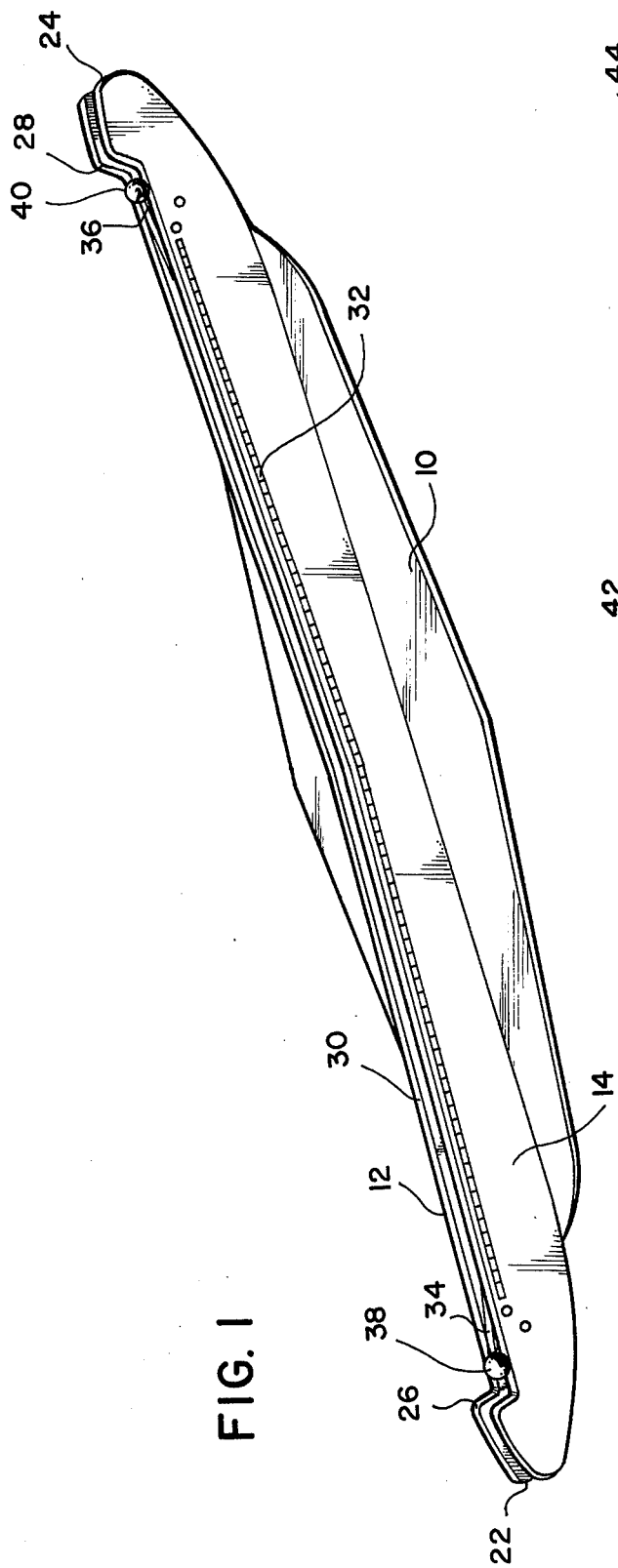
FIG. 1 is a perspective view of the apparatus in accordance with the present invention.
Figure 2:
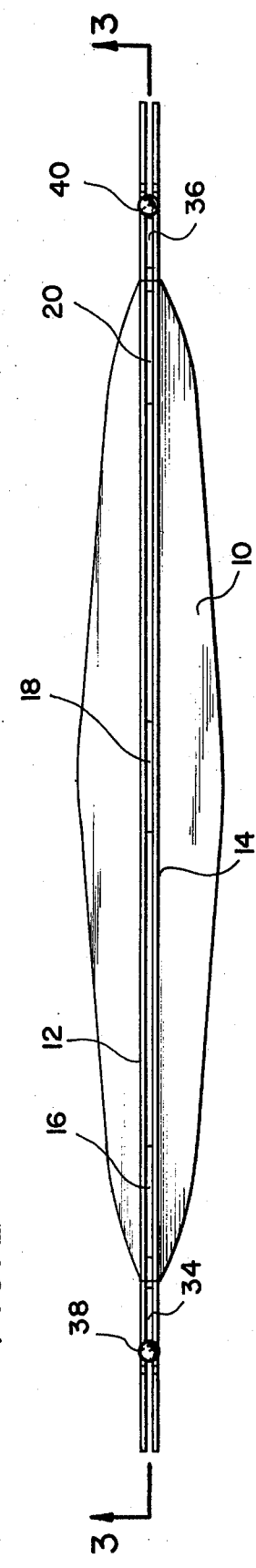
FIG. 2 is a plan view of the apparatus shown in FIG. 1.
Figure 3:
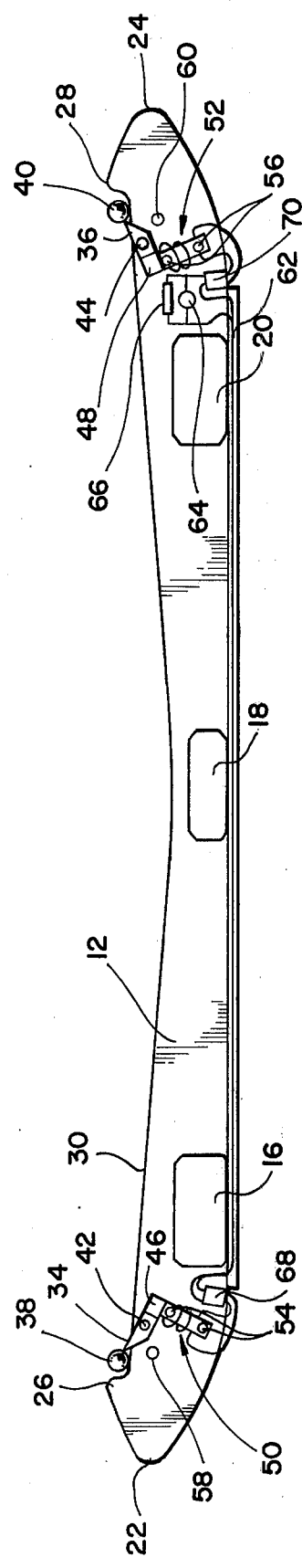
FIG. 3 is a cross-sectional view of the apparatus of FIG. 1 taken along the line 3—3 of FIG. 2.

Referring to FIGS. 1–3, the tracked incline teaching apparatus shown therein has an oval-shaped horizontal base 10 on which a pair of elongate, identically shaped, planar members 12 and 14 respectively, are vertically mounted in close and parallel alignment with one another. The base 10 and the planar members 12 and 14 may be made of wood, metal, plastic or other convenient material.

The base 10 is juxtaposed with the central portion of the bottom edges of the planar members 12 and 14 which extend therefrom in an upwardly curving direction. As shown more clearly in FIGS. 2 and 3, the stability of the structure is reinforced by three substantially rectangular planar support members 16, 18 and 20 which are inserted in the gap between the members 12 and 14 and attached to opposite sides thereof. One support member 18 is positioned at the center of the structure, and the other members 16 and 20 are equidistantly disposed therefrom.

The upwardly curving edges of the planar members 12 and 14 on both ends of the base 10 terminate in obtuse end sections 22 and 24 at opposite ends of the structure. Turning back upon themselves in an upwardly curving direction, the peripheral edges of the planar members 12 and 14 lead to a pair of shoulders 26 and 28 respectively, which define between themselves an inclined track 30, formed by the plane parallel top edges of the planar members 12 and 14 on both sides of the intermediate space. The track 30 has the shape of a double declivity comprising two slopes of identical length and of identical angle of inclination with respect to the horizontal, which are smoothly joined to one another at the center. In a preferred embodiment, the angle of inclination is between 5° and 30° in order to permit balls to roll along the track without bouncing off. A graduated scale 32 (FIG. 1) is aligned with the track along its entire length to enable measurements of the distances traveled by the respective balls.

A detent 34 projects outwardly of the space between the members 12 and 14 at the upper end of one side of the track 30, and a corresponding detent 36 is similarly positioned at the opposite end of the track 30. The detents 34 and 36 are disposed at a distance from the shoulders 26 and 28, respectively, sufficient to permit placement of balls 38 and 40, respectively, therebetween.

The detents 34 and 36 which are substantially wedge-shaped, are pivotally attached to the members 12 and 14 by pivot screws 42 and 44 horizontally extending across the space intermediate the members. Each of the detents 34 and 36 has a pointed end facing the shoulders 26 and 28 respectively, the balls 38 and 40 being disposed in the space intermediate the shoulders and the detents. The opposite ends of the detents 34 and 36 are blunt and each comprise a cavity in which a magnet 46 and 48 respectively, is embedded, having at least one outwardly facing contact area.

A pair of solenoids 50 and 52, each consisting of an electromagnetizable member, such as an iron bar, surrounded by a coil of wire, are fixedly attached by screws 54 and 56, respectively, to the planar members 12 and 14 at locations such that prior to the start of an experiment the upper end of each of the iron bars is contiguous with the contact area of one of the magnets 46 and 48. Transmission of an electric current of predetermined polarity through the coils of the solenoids 50 and 52 repels the magnets 46 and 48 and causes the detents 34 and 36 to pivot about the axes of the pivot screws 42 and 44 until their pointed ends are retracted into the space between the planar members 12 and 14 and out of the way of the balls 38 and 40. Stops 58 and 60, respectively, attached to the interior walls of the planar members 12 and 14, limit the pivoting movement of the detents 34 and 36. Upon interruption of the current supply, such as the opening of a switch in the circuit, the repulsive force between the solenoids 50 and 52 and the magnets 46 and 48 disappears, so that the detents are pulled back by the force of gravity acting on the heavy magnets at their blunt ends and resume their restraining position along the track 30.

Figure 4:
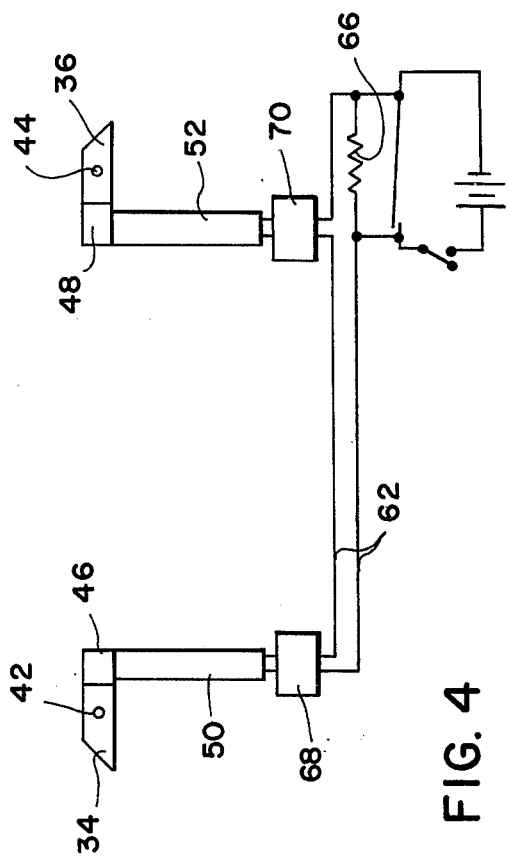
FIG. 4 is a schematic circuit diagram of the electromagnetic relay utilized to energize the apparatus of FIGS. 1–3.

Referring to FIG. 4, the solenoids 50 and 52 are conductively connected to one another by wires 62 led through the space intermediate the supports 16, 18, 20 and the base 10, as well as to a jack 64 (FIG. 3) disposed in the side wall of one of the planar members 12. A cable (not shown) connecting the jack 64 with a source of DC current such as a battery, may be plugged into the jack. Switching means for closing and opening the circuit (not shown) are included in the wiring as is well known in the prior art.

In a preferred embodiment of the invention one fixed resistor 66, and a pair of variable resistors 68 and 70 are connected to the terminals of the jack 64. Each of the variable resistors 68 and 70 which may be a voltage-sensitive varistor or a similar semiconductor component is associated with, and precedes one of the solenoids 50 and 52 in the transmission of current.

In operation, one or more balls 38 and 40 can be placed between the shoulders 26 and 28 and the detents 34 and 36. With one ball 38, for example, so placed on the track 30, upon closing the circuit to actuate the solenoids, the ball is released and travels down past the center of the track and up onto the other side a distance which can be visually measured by means of the graduated scale 32. The distance traveled back to the first track can then be measured and the decreasing amplitude and nature of such movement can be demonstrated. The speed of travel can be calculated as a function of distance per time and other determinations pertinent to the study of gravity can be made.

In other experiments two balls can be placed one on each end of the track. The circuitry is such that when it is actuated the balls are released simultaneously and it will be demonstrated that they meet exactly at the center of the track. This demonstration can be made with a hollow ball and a solid ball to illustrate the effect of rotational kinetic energy of the balls. A further demonstration can be made by rolling a ball filled with oil and one with water, in which case the balls will not meet in the center, but in a location which will illustrate how their respective velocities are affected by the liquid with which they are filled. Other experiments can include measurement with a spring of the forces required to support a ball on the tilted surface. Still other experiments are suggested by the material previously set forth above.

We claim:

1. A tracked incline teaching apparatus for illustrating the laws of physics by facilitating the observation of movement of balls on an incline, comprising: a pair of spaced apart members defining a track for said balls in the shape of two declivities of equal length, slanting toward each other at symmetrical angles of inclination with respect to a horizontal plane, and a center portion smoothly joining said declivities, a detent disposed on each of the opposite ends of said track and movable between a first, ball-retaining position and a second position for release of balls placed thereon for movement of said balls along said track in the direction toward each other, and trigger means for synchronously simultaneously moving said detents from said first to said second position.

2. The apparatus of claim 1 wherein each of the opposite ends of said track is bordered by an upwardly extending shoulder.

3. The apparatus of claim 2 wherein each of said detents is spaced from one of said shoulders by a distance permitting the placement of at least one of said balls between said shoulder and said detent.

4. The apparatus of claim 1 wherein said members are parallel planes formed with flat top edges disposed in parallel alignment with, and spaced from, one another.

5. The apparatus of claim 1 wherein said detents are wedge-shaped, and each comprise one pointed end projecting outwardly of said track and the opposite end positioned below the level of said track when said detents are in said first position.

6. The apparatus of claim 1 wherein said detents are pivotably disposed intermediate said planes defining said track and rotatable about an axis normal to the direction of the track.

7. The apparatus of claim 1 wherein said detents is said second position are stayed by stop means provided in said apparatus.

8. The apparatus of claim 1 wherein said trigger means comprises electromagnetic relay means including a pair of solenoids having an electromagnetizable member surrounded by a wire coil, each of said solenoids being fixedly attached to said apparatus proximate to one of said detents, said relay further comprising a magnet each embedded in one of said detents and having an outwardly facing contact area resting against one end of the electromagnetizable member of said solenoid when said detents are in said first position.

9. The apparatus of claim 8 wherein said contact area of each of said magnets is distal from the electromagnetizable member of each of said solenoids when said detents are in said second position.

10. The apparatus of claim 8 wherein said detents in said second position are returned to their first position by the force of gravity acting on said magnets.

11. The apparatus of claim 8 wherein said electromagnetic relay means comprise means conductively connecting said solenoids and said source of current.

12. The apparatus of claim 1 including a pair of balls on said track, one each between a respective shoulder and detent.

\* \* \* \* \*